United States Patent [19]

Williams

[11] Patent Number: 5,231,680
[45] Date of Patent: Jul. 27, 1993

[54] HORIZONTAL ADAPTIVE ERROR CONCEALMENT SYSTEM FOR COMPONENT DIGITAL TELEVISION SIGNALS

[75] Inventor: Robert A. Williams, Los Altos, Calif.

[73] Assignee: Ampex Systems Corporation

[21] Appl. No.: 830,790

[22] Filed: Feb. 4, 1992

Related U.S. Application Data

[63] Continuation of Ser. No. 632,287, Dec. 21, 1990, abandoned.

[51] Int. Cl.$^5$ ............................................. G06K 9/40
[52] U.S. Cl. ...................................... 382/54; 358/163; 358/314
[58] Field of Search .................. 382/54; 358/36, 166, 358/167, 366, 463, 163, 314; 364/7.24, 7.05, 7.12, 7.19

[56] References Cited

U.S. PATENT DOCUMENTS

| | | | |
|---|---|---|---|
| 4,122,489 | 10/1978 | Bolger et al. | 358/21 |
| 4,368,483 | 1/1983 | Liu | 358/166 |
| 4,376,289 | 3/1983 | Reitmeier et al. | 358/163 |
| 4,376,955 | 3/1983 | Reitmeier | 358/314 |
| 4,377,820 | 3/1983 | Reitmeier | 358/163 |
| 4,381,519 | 4/1983 | Wilkinson et al. | 358/163 |
| 4,393,414 | 7/1983 | Reitmeier | 358/314 |
| 4,419,687 | 12/1983 | Dischert et al. | 358/13 |
| 4,464,674 | 8/1984 | Schulz et al. | 358/163 |
| 4,470,065 | 9/1984 | Reitmeier | 358/163 |
| 4,498,104 | 2/1985 | Schulz | 358/163 |
| 4,718,067 | 1/1988 | Peters | 358/336 |
| 4,771,396 | 9/1988 | South et al. | 364/724.19 |
| 4,805,031 | 2/1989 | Powell | 358/463 |
| 4,837,624 | 6/1989 | Heitmann et al. | 358/336 |
| 4,941,186 | 7/1990 | Massmann et al. | 382/54 |

FOREIGN PATENT DOCUMENTS 2110898 10/1982 United Kingdom.

OTHER PUBLICATIONS

Videotape Recording: Digital Component Versus Digital Composite Recording, E. Fraser Morrison, SMPTE Journal, Sep. 1982, pp. 789–795.
Error Correction and Concealment For Digital Video, K. H. Barratt 12th Intl. TV Symp & Tech. Exhibration Montreux, 1981, e.g., p. 109.

Primary Examiner—Leo H. Boudreau
Assistant Examiner—Christopher Kelley
Attorney, Agent, or Firm—George B. Almeida

[57] ABSTRACT

Error concealment of an erroneous pixel in a line of pixels is provided by adaptively using a large number of adjacent correct pixels along the same horizontal line. The invention discards any corrupted adjacent pixel which would be used in the calculation for a replacement pixel value, while modifying the weighting of the remaining adjacent correct pixels in accordance with the error pattern generated by the corrupted pixel or pixels. An overflow detection circuit also is included, which provides an acceptable replacement pixel value rather than using the unacceptable overflow value.

17 Claims, 3 Drawing Sheets

HORIZONTAL ADAPTIVE ERROR CONCEALMENT SYSTEM FOR COMPONENT DIGITAL TELEVISION SIGNALS

This is a continuation of copending application Ser. No. 07/632,287 filed on Dec. 21, 1990 now abandoned.

BACKGROUND OF THE INVENTION

The invention relates to an error concealment system for component digital video signal systems and, in particular, to an error concealment system which replaces an erroneous pixel by adaptively filtering a large number, e.g., 16, adjacent horizontal pixels, half on each side, while uniquely weighting the pixel values being used in the calculation to compensate for any corrupted adjacent pixels.

As is well known in the art, errors occur in the handling of video signals such as, for example, when recording and reproducing television signals via magnetic tape record/reproduce systems. Such errors occur, for example, due to noise or to dropouts occuring during the record/reproduce process, and cause the corruption of the reproduced signals. That is, the reproduced television signal does not correspond exactly to the original signal, and the resulting displayed television picture is degraded.

There are two main approaches to dealing with errors in digital television signals. The first approach is error correction, which involves the production and use of additional data signals purely for the purposes of error detection and correction, wherein the additional data signals otherwise are redundant. While the error correction process provides preferred results, it requires an excessive amount of additional data and thus cannot generally be used as the sole means of dealing with errors.

The second approach is error concealment, and is the process of concern in this application. Concealment utilizes the replacement of an erroneous data signal by a data signal generated from available uncorrupted data signals. In the field of television, the concealment approach relies largely on the strong correlation that exists in a television signal, to provide accuracy. In the case of such television signals which contain large amounts of redundancy, individual bits usually do not contain vital information. Thus knowledge of errors in the signal may be exploited to maintain acceptable signal quality. It may be said then that the error concealment process simply consists of hiding the error. For example, if an error detector indicates that the digital word corresponding to a pixel, that is, to a video sample, contains an error that cannot be corrected, such error may be hidden by replacing the erroneous pixel by an interpolated pixel whose value closely approximates what would be the correct pixel value.

As well known in the art, there are various interpolation techniques used in providing error concealment in either a television composite signal system, or a component signal system, which techniques include, for example, previous pixel repetition, extrapolation using two or more previous pixels and interpolation between preceding and following pixels.

Typical of error concealment schemes used in component signal systems, are schemes which determine the amount of information from pixels which extend in a selected direction along a line passing through an erroneous pixel. More particularly, such schemes provide a replacement pixel for the erroneous pixel by averaging pixels in a selected direction if the information in said direction is less than a preselected threshold, and averaging pixels in another direction if the information in said direction is greater than the selected threshold. The more typical of such schemes generally uses only two directions of adaptive filtering, uses simple averaging filters, and requires that all surrounding samples be error free. This limits the type of picture material and the error levels generally preferred for adequate concealment. In addition, such systems generally implement the adaption process by looking in a single direction such as, for example, the horizontal direction.

In an alternate concealment scheme, a replacement pixel may be provided from pixels extending in several directions from the erroneous pixel. The replacement pixels taken from any of the directions generally lie along a respective line which passes through the erroneous pixel. The correction value in the direction having the smallest value is used to replace the erroneous pixel. In the event one pixel in a particular direction is incorrect, the accumulated value derived from that line of pixels is discarded entirely. Thus, the replacement values from one or more directions may be discarded in their entirety and accordingly, valid samples in such direction also are not used in any way to calculate the optimum concealment replacement value. It follows therefor that this system requires that all surrounding samples be error free. Although this scheme is preferred to the two direction scheme of previous mention, it does not provide an optimized concealment system since it does not utilize all adjacent pixels that are valid in the calculation for a replacement pixel, but instead discards valid adjacent pixels in a direction in which a corrupted adjacent pixel is found.

SUMMARY OF THE INVENTION

The present invention overcomes the shortcomings of the prior art in that it provides preferred concealment of errors in a component signal system under more varied picture and error conditions. Further, optimal concealment is provided employing a relatively simple FIR filter which, however, contains a large number of taps for deriving a pixel replacement value from a single horizontal line of adjacent pixels. To this end, the invention system replaces an initial erroneous pixel by evaluating, for example, of the order of 16 correct pixels which lie along the same horizontal line as the erroneous pixel, and by then weighting the pixels to compensate for any incorrect pixels which are being used in the calculation for the replacement sample. In particular, the invention expands the filtering process to eight pixels on either horizontal side of the erroneous pixel. This increases the bandwidth significantly so that picture material containing fine detail can be adequately concealed for errors. In addition, the filtering process also is adaptive in that adjacent corrupted pixels along the horizontal line are not used in the filtering process, and the weighting coefficients of the remaining good pixels which are used in the calculations are modified accordingly, to allow the proper concealment of a wide variety of error conditions. That is, the error pattern of the adjacent pixels is used to modify previously selected weighting coefficients of the remaining adjacent good pixels. Optimal values for the weighting coefficients are calculated by computer simulation using a digital frequency sweep pattern and minimizing the mean squared error of the pixel replacement value. The net advantage is to create a digital filter with acceptable error characteristics with maximum bandwidth for best image quality.

Thus, the invention provides an error concealment technique for preferably a component video signal system, which adaptively uses a large number of adjacent correct pixels in the horizontal direction to provide the concealment information. In particular, the invention technique discards any corrupted adjacent pixel to be used in the calculation for the replacement pixel value, while modifying the weighting of the remaining adjacent correct pixels in accordance with the error pattern resulting from the corrupted pixel or pixels. In addition, the invention multiplies the plurality of pixels by the respective selected and modified weighting coefficients and, if the modified weighted sum of the products exceeds a selected range of valid video values, detects such condition and uses, for example, the most recent valid pixel value rather than the unacceptable overflow value.

DESCRIPTION OF THE PREFERRED EMBODIMENTS

Figures 1, 2:
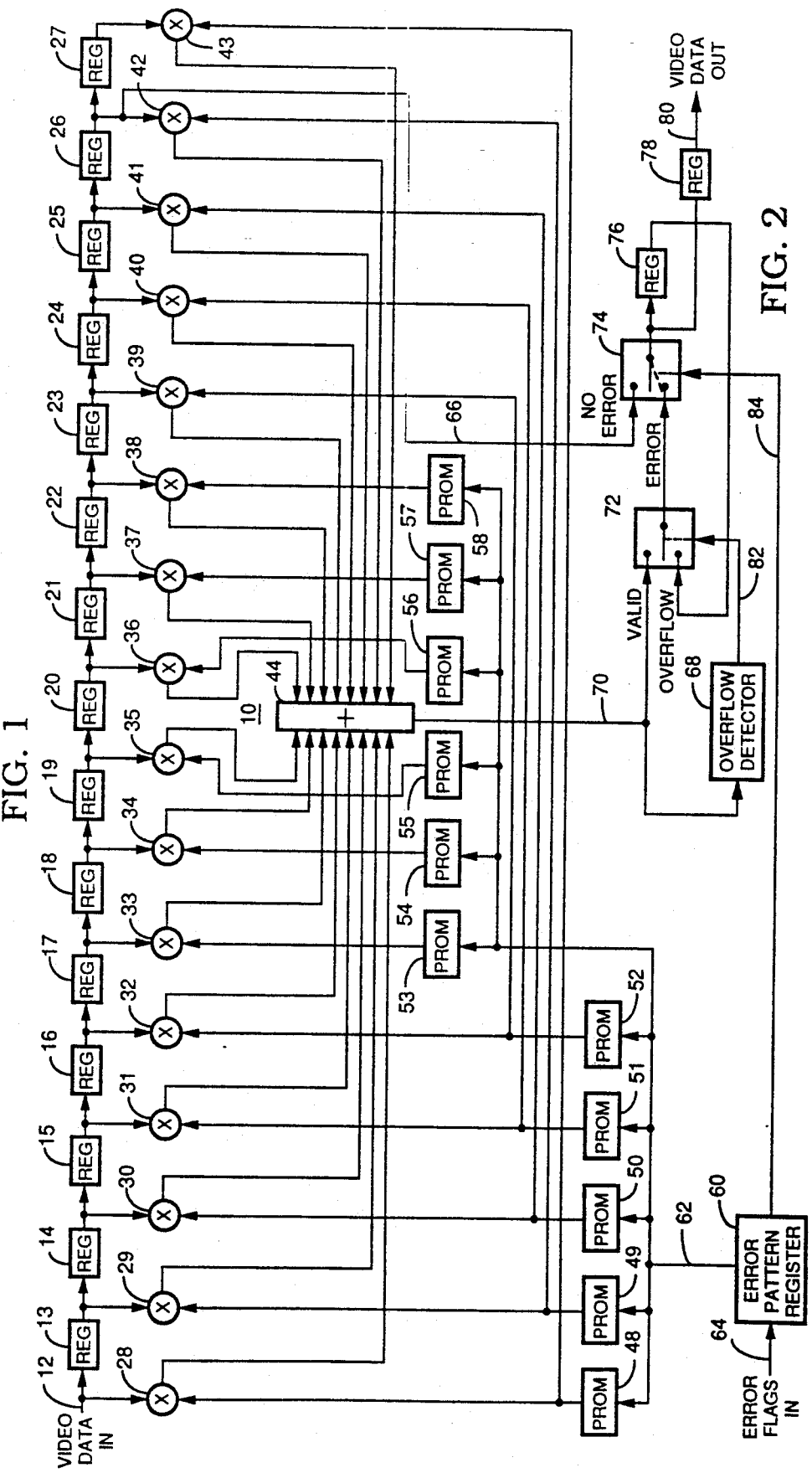
FIG. 1 is a pictorial view of an erroneous pixel and the large plurality of successively adjacent horizontal pixels used to provide error concealment information.
FIG. 2 is a block diagram depicting an embodiment of the invention combination.

Referring to FIG. 1, there is depicted a plurality of pixels disposed sequentially adjacent on the same horizontal line as an initial erroneous pixel. Valid pixels are designated by an O, while the erroneous pixel is designated by an X. By way of example only, and as further described below, each pixel value supplied to the error concealment system is digitally encoded in 8 bits and is accompanied by an error flag of 1 bit. The latter bit indicates whether an associated adjacent pixel is valid or erroneous. The digital samples corresponding to the erroneous pixel and the successively adjacent pixels are made available in a serial stream as described hereinbelow in the discussion of FIGS. 2 and 3. In accordance with the invention, and by way of example only, the technique generally provides eight successive pixels immediately preceding and immediately following the erroneous pixel on the same horizontal line.

Referring now to FIG. 2, there is illustrated by way of example, a circuit for performing the adaptive error concealment of the invention. The upper half page of the circuitry consists of essentially a finite impulse response (FIR) filter 10, which has the capability of changeable coefficients at any sample point. Generally FIR filters have fixed coefficients which can not be changed on a sample-by-sample basis. Thus the FIR filter 10 of FIG. 2 typically is termed a time variant FIR filter.

A VIDEO DATA IN signal is supplied on an input bus 12 and may comprise, for example, a luminance component signal or a color signal formed of chrominance components (R-Y, B-Y). Thus, the present error concealment system generally provides the concealment process for a baseband video signal such as, for example, a component color television signal. A separate channel is provided for processing the luminance signal independently of the chrominance signal. The signal is supplied as 8 bit video data to a plurality of serially connected registers 13-27, via the bus 12. As may be seen, the register 20 is a centrally located register, with seven registers 13-19 successively preceding the register 20, and with seven registers 21-27 successively following the register 20. However, the register 20 is a double register, wherein the first of the registers is the center register which supplies the erroneous pixel and which accordingly is not used. The second of the double register is used as the output of register 20. Thus the FIR filter 10 generally is a symmetrical filter about its center. The 8 bit video data, whether a luminance signal or chrominance difference signals, are consecutively delayed by the series of registers 13-27, with each sample being delayed by one clock time interval. Thus, in essence, the registers 13-27 define a long shift register. The samples are available at the outputs of respective registers in a continuous block along the horizontal line. Thus, there are 16 samples available starting at the input bus 12 and extending through the registers 13-27.

The video data input bus 12, as well as the output of each of the registers 13-27 are, in turn, coupled to respective multipliers of a series of multipliers 28-43. The outputs of the multipliers 28-43 thence are coupled to an adder means 44. The registers, multiplier and the adders means comprise in essence the FIR filter 10 of previous mention.

A second input to the multipliers 28-43 is supplied by a series of programmable read only memories (PROM) 48-58 in the preferred embodiment described herein by way of example. The PROM's supply sets of coefficients to the multipliers, 28-43, which then respectively multiply the pixel sample supplied thereto by the coefficient supplied from the PROM's 48-58. Since the filter 10 is a symmetrical filter about it's center, (except as discussed below) the very first and last samples from the input bus 10 and the register 27 respectively, are multiplied via the multipliers 28 and 43 by the same coefficient supplied by the PROM 48. Likewise the second sample from register 13 and the second-to-last sample from register 26 are multiplied, via the multipliers 29 and 42, by the same coefficient from the PROM 49, and so on down the line of registers 13-16 and 23-27 and PROMs 48-52. The use of a symmetrical filter is advantageous in that it is a linear phase filter which does not suffer phase distortions, and is a filter with a more economical configuration. However, it is understood that a separate PROM may be provided for supplying a coefficient to each of the multipliers, particularly if the filter is not symmetrical, or partially non-symmetrical, or partially non-symmetrical. To this end, the PROMs 53-58 supply respective coefficients to the multipliers 33-38, whereby the samples from the registers 17-22 are multiplied by their respective coefficient. Such a configuration allows more flexibility of operation while reducing the hardware requirement.

In turn, the PROMs 48-58 are driven by an error pattern register 60 via a bus 62, in response to an error flag signal input on an error flag line 64. The error flag may be, for example, a 9th bit extracted from the video data signal supplied to the input bus 12, which bit accompanies and validates or invalidates the associated 8 bits of video data supplied to the multipliers 28-43. The error flag indicates whether the respective 8 bits of video data being supplied to the multipliers is in fact corrupted. Thus the error flags are provided at the clock rate and are stored in the error pattern register 60 in a one-for-one relationship with the incoming video data on the input 12. The error pattern register 60 is in essence a bank of 16 registers, each only 1 bit wide. The resulting error pattern SELECTION signal commensurate with an existing error pattern is supplied to the 5 PROMs 48-58, and is an 11 bit binary control signal which selects that set of coefficients which corresponds to a specific pixel error pattern.

It may be seen that the PROMs 48-58 are driven by the error pattern determined via the error pattern register 60. Given the configuration of 8 successively adjacent bits on either side of the erroneous pixel, there are 16 bits of error pattern possible. That is, there are $2^{16}$ or 65,000 error patterns possible. The values of the sets of coefficients are determined by the error pattern which, in turn, is determined by the location of a corrupted pixel or pixels in the 16 pixels successively adjacent to the erroneous pixel shown in FIG. 1. Thus the PROMs 48-58 supply the multipliers 28-43 with a particular set of filter coefficients based on the error pattern selection signal 62 supplied by the error pattern register 60.

The coefficients stored in the PROMs 48-58 may be derived by computer simulation based on the error patterns possible. The values were derived by a computer program that took into account the critical picture material provided by a test pattern such as that known in the television field as a "circular zone plate". The computer then generates a coefficient for every combination of possible error patterns and determines a set of coefficients for each error pattern that would provide the best filter response. That is, the computer program determines the coefficients that produce the maximum possible bandwidth with minimum acceptable level of ripple for the pass band of the respective bandwidth. Once the sets of coefficients for each filter is determined, the coefficients are programmed into the PROMs 48-58. It follows that for any possible error pattern that may exist in the pixels successively adjacent an erroneous pixel, and in response to the error pattern signal on the bus 62, the PROMs instantly supply the corresponding set of coefficients which are required to calculate the best replacement pixel value for the erroneous pixel.

Further in accordance with the invention combination, an overflow circuit is provided to determine whether the large number of bits being added exceed the range of 8 bits, or whatever number of bits are being used. In addition, a NO ERROR bus 66 is provided to the overflow circuit, whereby valid pixel samples are supplied to the overflow circuit. In response to the error pattern register 60, the valid samples are by-passed around the FIR filter 10 in the event that no erroneous or corrupted pixels are detected in the video data stream, and are supplied as a video data output signal as discussed below.

To this end, by way of example in FIG. 2, an overflow detector 68 and a VALID input of a first switch means 72 are coupled to the adder means 44 via a bus 70, and receive therefrom a replacement pixel sample generated by the FIR filter 10. The output of the switch means 72 is coupled in turn to an ERROR input of a second switch means 74. The output of the register 26 comprises the NO ERROR signal on bus 66, which is coupled to the NO ERROR input of the switch means 74. Bus 66 provides a path for the valid data sample when there is no erroneous or corrupted pixel. The output of switch means 74 is fed back to an OVERFLOW input of the switch means 72 via a register 76.

The output of switch 74 also is coupled to a register 78 which provides either the calculated replacement pixel sample, or passes the valid pixel sample, as the VIDEO DATA OUT signal via a bus 80. The overflow detector 68 provides a control signal for switching the switch means 72 to either the VALID or OVERFLOW switch position. The error pattern register 60 provides a control signal via a line 84 for switching the switch means 74 between the ERROR or NO ERROR switch positions.

As may be seen from the block diagram, if the system overflows, the overflow detector 68 detects the condition and switches the switch means 72 to the OVERFLOW position. The last good sample which is available via the register 76 then is supplied as the replacement pixel on output bus 80 via the switch means 72, the switch means 74 and the register 78.

In addition, the switch means 74 provides means for insuring that only an erroneous sample is replaced by the FIR filter 10. In the event that there are no erroneous or corrupted samples, the valid samples are passed through the circuitry via the bus 66, and the switch means 74, in response to the control signal from the error pattern register 60 on the line 84. Thus, the switch means 74 is kept in the NO ERROR position until such time as the error pattern register 60 determines the presence of erroneous pixel and changes the switch means 74 to the ERROR position to pass the calculated replacement pixel. During the same time, the register 60 supplies the set of filter coefficients determined by the error pattern to the multipliers. Thus, the video data output on the bus 80 is either any valid pixel samples supplied to the video data input bus 12, or are replacement pixel samples generated by the FIR filter 10 and supplied via the bus 70 and switch means 72, 74.

There are various circuit configurations for the adder means 44 of FIG. 2 which are capable of adding a large plurality of values such as the 16 samples herein. For example, an adder tree configuration may be utilized which successively adds selected groups of samples through successive addition stages. Further, multi-tap FIR filters, and the PROMs 48-58 and their connections to the FIR filter, are generally known in the art. Accordingly, these components therefore are not further described herein.

There are also alternate processes for supplying a replacement pixel in the event of overflow of the system. For example, upon the detection of an overflow condition by the overflow detector 68, circuitry may be provided in place of that shown in FIG. 2, which clip the sample value supplied by adder means 44 on bus 70 to some maximum value. For example, if the range of values varies from binary $-128$ to a $+127$, a resulting value greater than $+127$ is clipped to some value less than 127, etc. Thus all the binary values from the FIR filter would be valid and supplied to the VALID input of the switch means 72 for subsequent output as the pixel replacement value.

Figure 3:
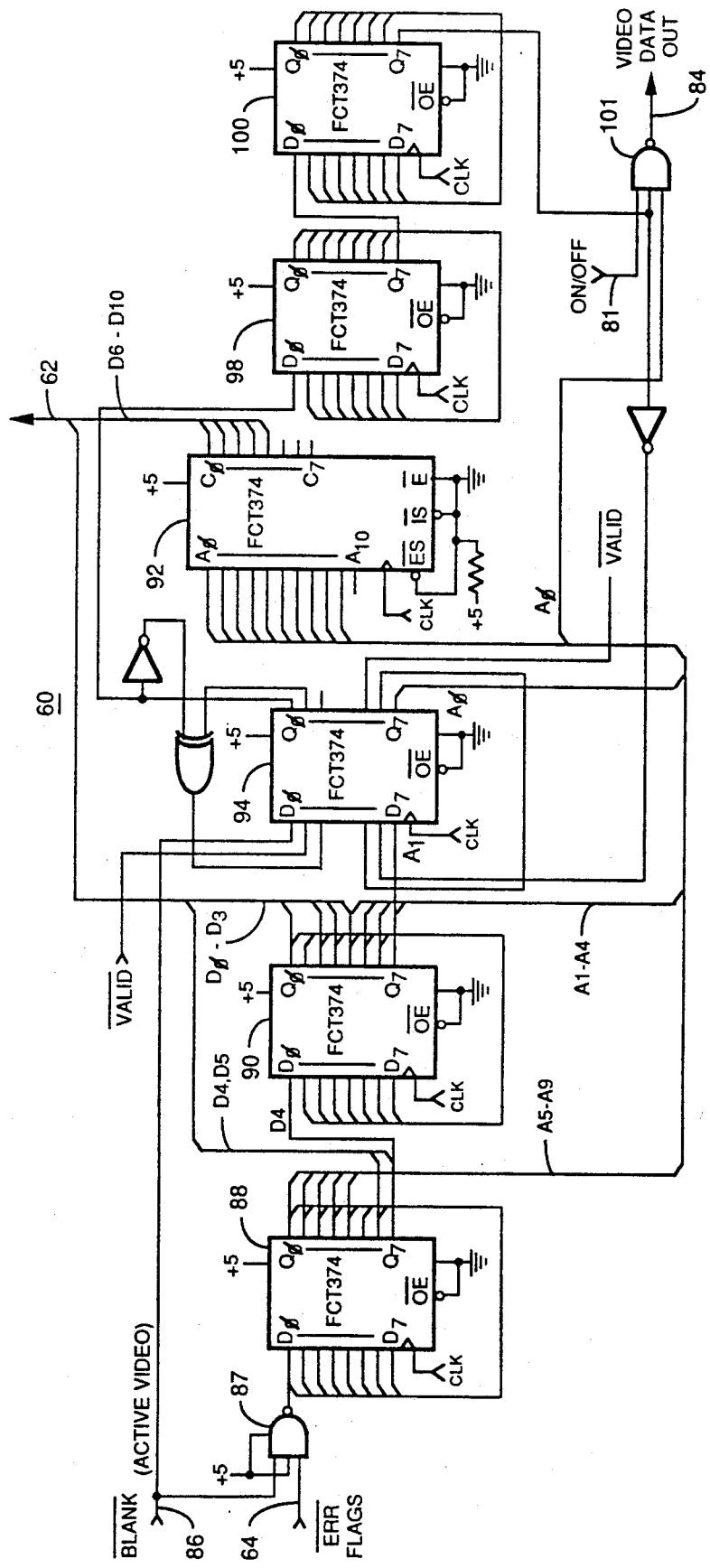
FIGS. 3 and 4 are schematic diagrams of the error pattern register and overflow handling circuits of the block diagram of FIG. 2.

Referring now to FIG. 3, the error pattern register 60 is further shown in schematic. The error flag on the input line 64 of previous mention is supplied to the register 60, along with a blanking signal such as horizontal or composite blanking on a line 86. The signals are supplied to a NAND gate 87, which, in turn, is coupled to the first of two banks of registers 88, 90 which provide 16 serial 1 bit registers clocked in synchronism with the registers 13-27 of FIG. 2. The blanking signal on line 86 disables the error pattern register 60, whereby the concealment process is not performed during a blanking interval. The registers 88, 90 are coupled to an OR gate/PROM circuit 92 and a register 94, wherein circuit 92 and registers 88, 90 together provide the error pattern SELECTION signal on bus 62 extending to the PROMs 48-58. The register 94 supplies a blanking signal to a first of two registers 98, 100 which, in turn, provide the control signal on line 84, and to a NAND gate 101 which controls the switching of the switch means 74 of the overflow circuit (FIG. 4).

The error pattern register 60 shown in FIG. 3, includes the OR/PROM circuit 92 by way of example only, as a means for simplifying the number of components required, as well as to add flexibility to the circuit operation. The OR/PROM circuit 92 provides a form of coarse compression by simultaneously examining a pair of error flags on the most distant pixels relative to the erroneous pixel. More particularly, the circuit 92 examines the five outermost pixel samples at either extreme of the erroneous pixel, and OR's pairs of the symmetrical samples values together to provide one flag for each symmetrical pair of samples. This reduces the number of controls needed from 10 to 5 and provides a more manageable circuit. If either of a pair of pixels is corrupted, both pixel samples are discarded. It is understood that the OR/PROM circuit 92 could be deleted and error flag signals could be supplied to control the examination of each of the outermost five pairs of pixels independently.

Figure 4:
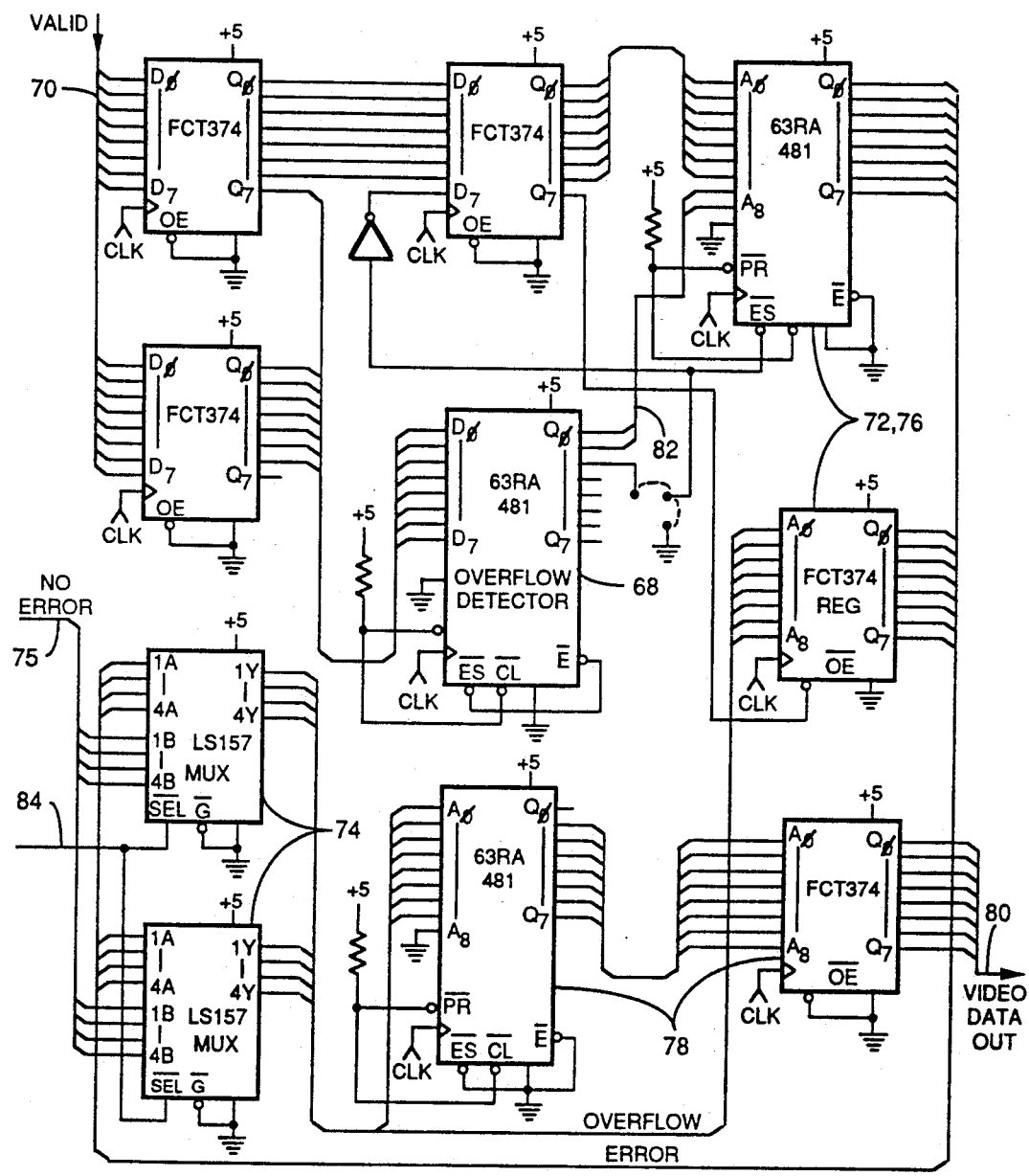

Referring to FIG. 4, the components 68, 72, 74, 76 and 78 of FIG. 2 are shown in schematic, and illustrate an implementation for detecting an overflow condition in the FIR filter 10, for correcting the situation, and also for providing a bypass path for supplying the original input video data to the output bus 80 in the event there are no erroneous or corrupted pixels. FIG. 4 further shows the VALID replacement sample signal supplied via the bus 70, and the NO ERROR signal supplied to the switch means 74 via the bus 75. The switch means 72 and register 76 operate together to supply the function shown in block in the FIG. 2, that is, to circulate the most recent valid sample back to the OVERFLOW input of the switch 72. The output from the overflow circuit is shown as the VIDEO DATA OUT signal on output bus 80.

It may be seen that the overflow detector 68 is essentially a comparator which compares two digital words to determine if one value is greater or less than another value. Thus the overflow detector 68 can detect if the adder means 44 is exceeding its range. The rest of the overflow circuitry then provides feedback from the register 76 in the event of an overflow condition to thereby supply the most recent valid sample as the replacement pixel value on the output bus 80. A signal herein labeled ON/OFF is supplied on a line 81 to the NAND gate 101 and provides means for enabling or disabling the overflow circuitry in response to, for example, a computer command.

It is understood that the circuit of FIGS. 2, 3 and 4 are duplicated in a system handling a component color television signal. That is, a circuit is required for the luminance component and another circuit is required for the chrominance R-Y, B-Y components. The filter for the chrominance circuit is one-half the size of that shown in FIG. 2, mainly because there are one-half as many chrominance samples as luminance samples in the component color television signal. Multiplexing of the R-Y, B-Y components are handled by a double set of registers, wherein there are two registers for every register in the FIR filter 10 of FIG. 2. Thus the R-Y samples are available at the outputs of their respective multipliers on one clock cycle, and will be shifted down one register at the next clock cycle. At this time the B-Y component is available from their respective registers. Thus the R-Y and B-Y component samples are alternately calculated every clock.

In view of these and other modifications, it is intended that the scope of the invention be defined by the following claims and their equivalents.

What is claim is:

1. A method for concealing an erroneous pixel in a line of pixels of a video signal, wherein each pixel is associated with a corresponding filter coefficient, and wherein an error flag indicates the presence of an erroneous pixel, comprising the steps of:
    denoting the presence of said error flag indicative of said erroneous pixel in the line of pixels;
    in response to the erroneous pixel presence, indicating the presence of a corrupted pixel in a preselected number of preceding and following pixels successively adjacent to and on the same line as the erroneous pixel, which preceding and following pixels represent a corresponding adjacent pixel error pattern indicative of the presence of any corrupted pixel and of remaining uncorrupted pixels;
    discarding the use of said any corrupted pixel;
    modifying the filter coefficients of remaining uncorrupted pixels of said preselected number of adjacent pixels preceding and following the erroneous pixel to compensate for the effects of discarding the use of the corrupted pixel; and
    calculating in response to the modified filter coefficients a replacement pixel for said erroneous pixel from the remaining uncorrupted pixels of the preselected number of adjacent pixels.

2. The method of claim 1 including:
    storing on the order of from six to ten pixels corresponding to the preceding and following pixels of said preselected number of pixels successively adjacent and on the same line as the erroneous pixel;
    discarding the use of said any corrupted pixel of said stored pixels in response to the step of indicating; and
    modifying the filter coefficients of the remaining stored uncorrupted pixels in accordance with the error pattern caused by any discarded corrupted pixel.

3. The method of claim 1 wherein:
    the step of modifying includes supplying a plurality of sets of filter coefficients indicative of different adjacent pixel error patterns; and
    utilizing one of the plurality of sets of filter coefficients in response to the step of indicating to calculate said replacement pixel.

4. The method of claim 3 wherein the step of supplying includes:
    storing each of the plurality of sets of filter coefficients in a readable storage means; and
    retrieving said one of the plurality of sets of filter coefficients in response to the step of indicating.

5. The method of claim 1 including the steps of;
    detecting a condition wherein the value of the replacement pixel is not within a preselected range of valid video values, which condition invalidates the replacement pixel calculated during the step of calculating; and providing a substitute pixel value to replace the invalid replacement pixel.

6. The method of claim 1 including the steps of:
deleting the steps of discarding and modifying when the step of indicating fails to determine the presence of a corrupted pixel;
calculating the replacement pixel from the uncorrupted preselected number of adjacent pixels; and
outputting the corresponding uncorrupted line of adjacent pixels with the calculated replacement pixel.

7. A circuit for concealing an erroneous pixel in a line of pixels of a video signal, including filter means having a plurality of taps corresponding to the line of pixels and having a like plurality of filter coefficients, wherein said erroneous pixel is indicated by an error flag, comprising:

means for indicating an error pattern defined by a corrupted pixel among uncorrupted pixels in a preselected number of adjacent pixels preceding and following the erroneous pixel in the line of pixels;

means responsive to said indicating means for discarding the use of any corrupted pixel which along with the uncorrupted pixels define said error pattern;

means for modifying the filter coefficients in accordance with said preceding and following adjacent pixels defining said error pattern to compensate for the effects of discarding the use of said any corrupted pixel; and means for calculating a replacement pixel for said erroneous pixel from said uncorrupted pixels of the preceding and following pixels defining said error pattern in response to the modifying means.

8. The circuit of claim 7 including:
means for providing an error flag to the indicating means which is indicative of a corrupted pixel; and
said indicating means includes an error pattern recognition means responsive to said error flag for determining the error pattern.

9. The circuit of claim 7 wherein the modifying means include:
means for storing a plurality of sets of filter coefficients indicative of different error patterns in the preselected number of adjacent pixels; and
said storing means supplys one of the plurality of sets of filter coefficients to the calculating means in response to the indicating means.

10. The circuit of claim 9 wherein the storing means include a plurality of programmable memories for storing the plurality of sets of filter coefficients indicative of different error patterns, said programmable memories being responsive to said indicating means to supply one of said plurality of sets of filter coefficients corresponding to the associated error pattern.

11. The circuit of claim 7 including:
means for detecting a data overflow condition in the calculating means, wherein the overflow condition is defined as the generation of a replacement pixel value which is not within a preselected range of valid video values; and
means responsive to the detecting means for generating a substitute pixel value to replace the erroneous pixel.

12. The circuit of claim 11 wherein the generating means includes means responsive to the detecting means for retaining a most recent valid replacement pixel for use as the substitute pixel value in the event of the overflow condition.

13. A circuit for concealing an erroneous pixel in a line of pixels of a video signal, including filter means having a plurality of taps for supplying respective pixels of the line of pixels, wherein the presence of said erroneous pixel is indicated by an error flag, comprising:

means responsive to the erroneous pixel presence for providing a selection signal indicative of an error pattern caused by a corrupted pixel among uncorrupted pixels in a preselected number of pixels preceding and following the erroneous pixel in the line of pixels;

readable memory means for supplying digital signals representative of respective filter coefficients for said uncorrupted pixels, which coefficients have been modified in response to the selection signal provided by the providing means;

a plurality of multipliers for multiplying respective pixels of the line of pixels by respective said digital signals supplied by the readable memory means to provide multiplier output signals corresponding to a plurality of product values; and summing means responsive to the multipliers for generating a replacement pixel value for said erroneous pixel from the plurality of multiplier output signals.

14. The circuit of claim 13 wherein said readable memory means contain a plurality of sets of filter coefficients indicative of different error patterns in the preselected number of preceding and following pixels.

15. The circuit of claim 14 wherein the providing means includes register means having a plurality of outputs corresponding to the plurality of taps, for determining the presence and location of any corrupted pixel; and
said readable memory means being responsive to the register means to supply one of the plurality of sets of filter coefficients to the plurality of multipliers.

16. The circuit of claim 13 wherein:
said providing means bypasses the line of pixels around the multipliers and summing means in response to the absence of an erroneous pixel, to supply the line of pixels as a video signal output.

17. The circuit of claim 7 wherein the filter means is a symmetrical filter, wherein the discarding means discards the corrupted pixel in one half of the symmetrical filter, and further discards a pixel which is the symmetrical complement of the corrupted pixel in the opposite half of the filter, to thus discard the use of symmetrical pairs of pixels when one pixel of the pair is corrupted.

* * * * *